April 30, 1974  T. W. WEBB  3,808,116
POLAROGRAPHY

Filed March 1, 1971  4 Sheets-Sheet 4

//

3,808,116
POLAROGRAPHY
Terence Wilfred Webb, Cornwall, England, assignor to English Clays Lovering Pochin & Company Limited, Cornwall, England
Filed Mar. 1, 1971, Ser. No. 119,634
Claims priority, application Great Britain, Mar. 5, 1970, 10,732/70
Int. Cl. G01n 27/34
U.S. Cl. 204—195 H                12 Claims

ABSTRACT OF THE DISCLOSURE

A polarographic cell comprises (i) a housing including a chamber, having a inlet and an outlet, which is adapted to have passed therethrough a flowing liquid solution or suspension, (ii) a dropping mercury electrode including a capillary tube extending into said chamber, and (iii) means for vibrating at least the capillary tube of said dropping mercury electrode.

BACKGROUND OF THE INVENTION

This invention relates to polarography and, more particularly but not exclusively, is concerned with the application of polarographic techniques to the quantitative analysis of one or more dissolved components in a flowing liquid solution or suspension.

The quantitative analysis of one or more dissolved components in an essentially static liquid solution or suspension using polarographic cells incorporating a dropping mercury electrode is well known and widely used. By an "essentially static liquid solution or suspension" there is meant a liquid solution or suspension which forms part of a closed system, isolated so as to facilitate analysis, within which the liquid may or may not be agitated or circulated. It has been usual for polarographic cells used in such circumstances to comprise a means of securely supporting the dropping mercury electrode so as to prevent vibration of the dropping mercury electrode. However, it has been proposed, in connection with certain polarographic cells, to vibrate the dropping mercury electrode for the purpose of agitating the liquid under test. The use of polarographic techniques to analyze quantitatively one or more dissolved components in a flowing liquid solution or suspension has not hitherto been practised.

SUMMARY OF THE INVENTION

According to the present invention there is provided a polarographic cell comprising a housing including a chamber, having an inlet and an outlet, which is adapted to have passed therethrough a flowing liquid solution or suspension; a dropping mercury electrode including a capillary tube extending into said chamber; and means for vibrating at least the capillary tube of said dropping mercury electrode.

The invention also provides a method for the quantitative analysis of one or more dissolved components of a flowing liquid solution or suspension using a polarographic cell according to the invention.

Generally, the chamber of a polarographic cell in accordance with the invention will contain, or will be adapted to receive, a reference electrode.

Advantageously, the apparatus includes a separator connected to the outlet of the polarograph housing in order to trap any mercury entrained in the liquid solution or suspension on passing through the polarographic cell.

We have found that the application of a substantially regular vibration to the capillary tube of a dropping mercury electrode, while it is in use in a polarographic cell, provides a polarographic cell well suited for use in the quantitative analysis of one or more dissolved components of a flowing liquid solution or suspension.

DESCRIPTION OF THE PREFERRED EMBODIMENTS

The means for vibrating at least the capillary tube of said dropping mercury electrode preferably effects substantially regular tapping of the capillary tube, for example by known mechanical, electrical or electromagnetic means. It is advantageous to apply substantially regular vibrations to the capillary tube of the dropping mercury electrode so as to produce a drop rate in the range of from 1 to 10 drops per second. This can be achieved by applying to the capillary tube substantially regular vibrations at a frequency in the range of from 1 to 10 Hertz. We have found that if the frequency of vibration is greater than about 10 Hertz, the sensitivity of the apparatus begins to become unacceptably low since the diffusion current measured by the polarographic cell is proportional to the drop time to the power of one-sixth ($t^{1/6}$). In addition, we have found that when the frequency of vibration is greater than 10 Hertz, the drop size tends to become so small as to make it difficult to recover the mercury from the flowing liquid solution or suspension. On the other hand we have found that if the frequency of vibration is less than about 1 Hertz, the natural drop rate for the capillary tube which is in use tends to become a controlling factor in determining the drop rate, and the drop rate tends to become non-constant and subject to random fluctuations; furthermore, the sensitivity of the apparatus becomes dependent on the flow rate and on the solids content of the flowing liquid which is passing through the apparatus. The amplitude of vibration employed is preferably such that a steady drop rate is achieved regardless of the natural drop rate of the capillary tube in use. The amplitude of vibration should not be so great as to damage the capillary tube. In general, a suitable amplitude will not exceed about 2 mm. The waveform of the applied vibration is preferably sawtooth in nature, since this can enable a stable drop rate to be achieved.

Preferably, the housing of the polarographic cell is adapted to have passed therethrough a flowing liquid solution or suspension at a rate which is in the range of from two to fourteen litres per minute. We have found that, if the flow rate exceeds fourteen litres per minute, mercury tends to be seriously entrained by the flowing liquid and it becomes difficult for the entrained mercury to be separated from the flowing liquid. We have also found that, if the flow rate is less than two litres per minute, incoming liquid solution or suspension does not completely flush out the material contained in the chamber of the polarograph, thus tending to give inaccurate and misleading results.

If a flowing liquid suspension is being analysed, it is preferable that the solids content of the suspension should be less than 35% by weight since we have found that, at least in an aqueous medium, a solids content greater than 35% can lead to inaccurate results because the viscosity of the suspension is so high as to prevent the incoming liquid from adequately flushing out the material contained in the chamber of the polarographic cell.

In one embodiment of the invention the housing comprises a support section, serving as a support for other parts of the polarographic cell; and a chamber bounded by a first portion of the housing having an inlet and an outlet for a flowing liquid solution or suspension, a baffle to prevent the liquid passing straight from the inlet to the outlet, and a second portion of the housing which can advantageously be removable for collecting the mercury falling from the dropping mercury electrode. It is also advantageous for this second portion of the housing to be made of transparent material, for example polymethylmethacrylate. A separator can be connected to the outlet to trap any mercury entrained in the liquid solution or suspension after passing through the polarographic cell. The separator can be, for example, a cylinder, e.g. a vertical cylinder, with a tangential inlet for the liquid solution or suspension and a central outlet in the top of the cylinder for said liquid solution or suspension. During use, a vortex forms within said vertical cylinder which forces any entrained mercury against the sides of the vertical cylinder where it falls, under the force of gravity, to the bottom of the vertical cylinder. Means can be provided at the bottom of the vertical cylinder to enable mercury to be removed at suitable intervals.

The electrical output of a polarographic cell in accordance with the invention can be fed to a suitable means of amplification and/or recording apparatus. It will be appreciated that the diffusion current measured by the polarographic cell varies as each mercury drop grows and subsequently detaches itself from the capillary tube and in order to damp out the fluctuations in the diffusion current a bank of capacitors of suitable time constant can be connected between the output of the polarographic cell and the input circuit of any amplification and/or recording apparatus used.

For a better understanding of the invention and to show how the same can be carried into effect, reference will now be made by way of example to the accompanying drawings, which show one embodiment of a polarographic cell in accordance with the present invention, and in which.

Figure 1:
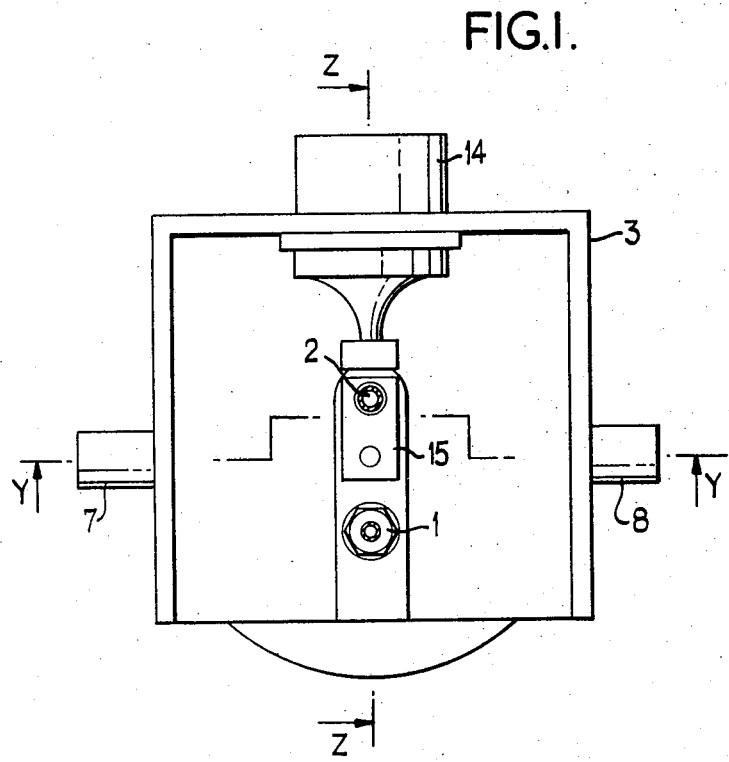
FIG. 1 is a plan view of a polarographic cell according to the present invention comprising an electrode assembly, including a reference electrode 1 (for example a saturated calomel electrode) and a dropping mercury electrode 2.
Figure 2:
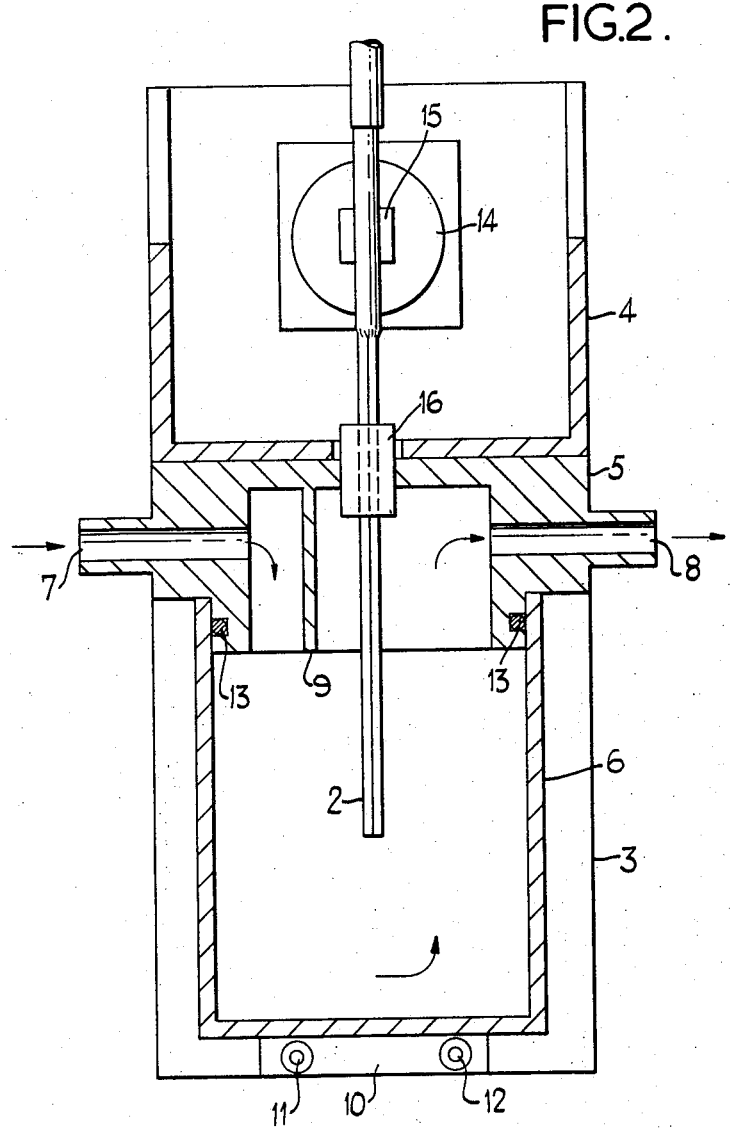
FIG. 2 is a sectional elevation on the line Y—Y of FIG. 1.
Figure 3:
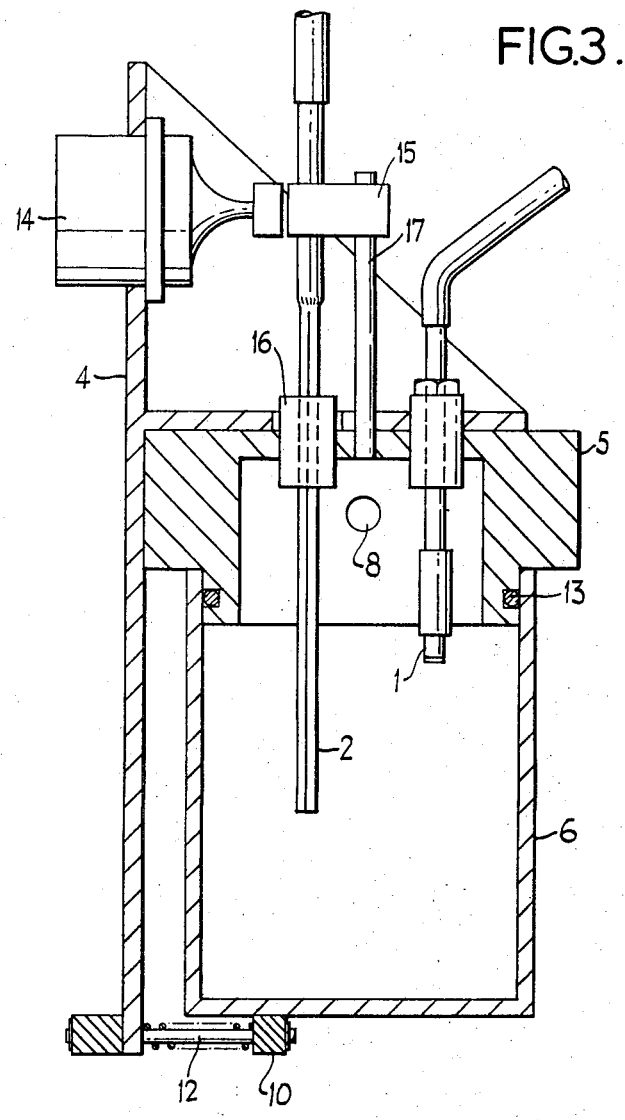
FIG. 3 is a sectional elevation on the line Z—Z of FIG. 1.

Referring first to FIGS. 1 to 3, there is shown a polarographic cell comprising an electrode assembly, including a reference electrode 1 (for example a saturated calomel electrode) and a dropping mercury electrode 2. A housing 3 comprises a support 4 for other parts of the polarographic cell, a first portion 5 having an inlet 7 and in outlet 8, and a removable second portion 6. The second portion defines a chamber, while the first portion defines an ante-chamber. The first portion 5 is also provided with a baffle 9 located adjacent inlet 7 and disposed so as to divert incoming liquid into the chamber below the level of the inlet and outlet to prevent the liquid passing straight from the inlet to the outlet. The second portion 6 is made of polymethylmethacrylate and encloses the lower end of the capillary tube of the electrode 2 and the reference electrode 1. The portion 6 is held in place by a bar 10, which can be made of polyvinyl chloride, and which is itself held in place by springs carried on rods 11 and 12. An O-ring seal 13 is provided between the portion 6 and the portion 5 of the housing. The upper end of the capillary tube of the dropping mercury electrode 2 is provided with an electro-magnetic vibrator 14 which strikes an anvil 15, held by a support 17, and through which said capillary tube passes. A sleeve 16 of flexible material is provided at the point where said capillary tube enters the upper portion 5 of the housing 3.

Figure 6:
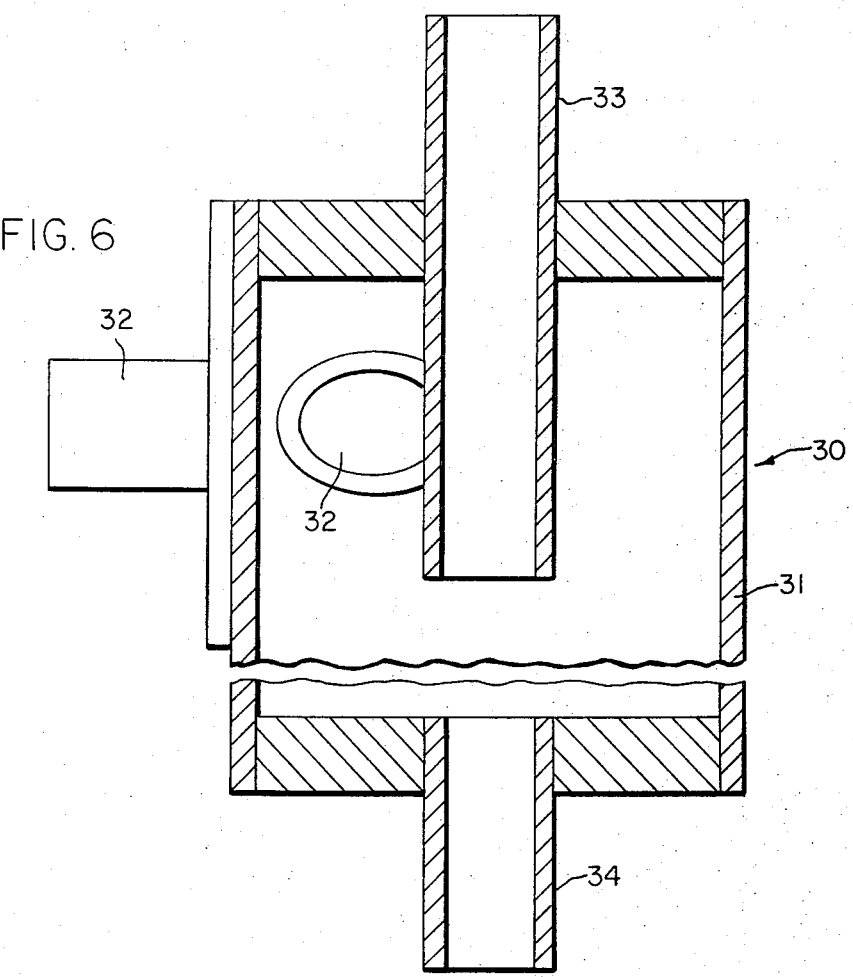
FIG. 6 is a diagrammatic elevation view of a separator useful in the embodiment of FIGS. 1–3.

A separator 30 as shown in FIG. 6 can be connected to the outlet 8 to trap any mercury entrained in the liquid solution or suspension after passing through the polarographic cell. The illustrated separator is a vertical cylinder 31, with a tangential inlet 32 for the liquid solution or suspension and a central outlet 33 in the top of the cylinder for said liquid solution or suspension. During use, a vortex forms within said vertical cylinder which forces any entrained mercury against the sides of the vertical cylinder where it falls, under the force of gravity, to the bottom of the vertical cylinder. Outlet 34 is provided at the bottom of the vertical cylinder to enable mercury to be removed at suitable intervals.

Figure 5:
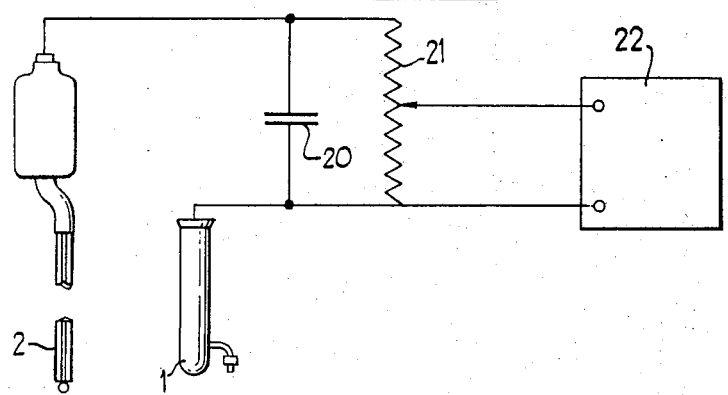
FIG. 5 is a circuit diagram of the polarograph and recording apparatus used therewith.
Figure 4:
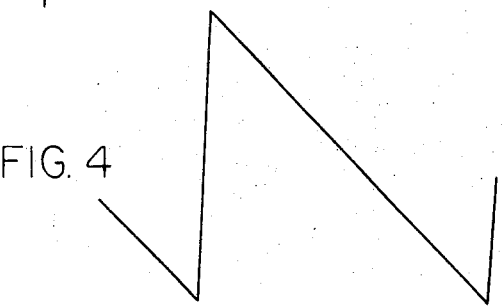
FIG. 4 shows a diagrammatic illustration of the waveform of the vibration applied to the capillary tube.

Referring next to FIG. 5, the dropping mercury electrode 2 and the reference electrode 1 are connected in parallel with a capacitor or bank of capacitors 20 and a 1 KΩ potentiometer 21. A proportion of the E.M.F. developed across the potentiometer 21 is fed to the input of a strip chart recorder 22. The apparatus can be calibrated by means of the potentiometer 21 so that a given concentration of a known component or components in the suspension is always represented by the same scale reading. The capacitor 20 should have a capacitance such that the current produced by the polarograph is smoothed to a level which gives an acceptable trace on the recorder. The value of the capacitance is dependent on the response time of the recorder; for example, if the recorder has a fairly long response time (about 10 seconds) the capacitance required would be much less than that required if the recorder has a short response time (about 0.1 second). For applications in which the changes in concentration being monitored by the apparatus occur slowly, a recorder with a response time of about 1 second can be used with a 20,000 μF capacitor. The input impedance of the recorder used should be at least five times the maximum impedance of the potentiometer 21.

In operation, the liquid solution or suspension to be analysed flows through the chamber at a suitable rate which is will usually found to be in the range from 2 to 14 liters per minute. Means for controlling the flow rate can be provided. The capillary tube is vibrated at a substantially regular frequency of 4 cycles per second. The amplitude of vibration is chosen as follows: initially, the amplitude of vibration is increased from zero to the lowest value at which a substantially regular drop rate of 4 drops per second is achieved. Then the amplitude is further increased until there is reached the highest value at which a substantially regular drop rate of 4 drops per second is maintained. The average of these amplitudes is then used in the operation of the polarograph.

The theoretical relationship between the concentration of a dissolved component of the flowing liquid solution or suspension and the diffusion current will now be considered with reference to a solution in which there is dissolved a dithionite bleaching compound. The theoretical relationship between diffusion current and dithionite concentration is of the form:

$$I_d = K m^{2/3} t^{1/6} C$$

in which $I_d$ is the average current during the life of a drop, K is a constant, $m$ is the mass flow rate of mercury for the dropping electrode, $t$ is the drop time, and C is the concentration of dithionite. The size of the mercury drop depends only on the internal diameter of the capillary tube in the electrode assembly and, as different electrode capillary tubes have slightly different diameters, provision is preferably made to adjust the hydraulic head on the mercury flowing through the capillary, so that the drop time (i.e. the time for one drop to grow and detach itself) and the mass flow rate can be kept constant. In this way, i.e. by varying the mercury drop size and mercury flow rate, the electrode unit can be adjusted to give the same diffusion current for a given dithionite concentration, this continuously variable sensitivity being useful as it enables the dithionite concentration to be read directly. The diffusion current, which is of the order of 3 microamps, is proportional to the concentration of dithionite present in the stream passing the electrodes and can be amplified for recording or controlling purposes. One form of amplifier-recorder consists of a high gain DC amplifier provided with a feed-back loop to control the overall gain, the input signal being the potential difference between the ends of a 500-ohm resistor in the electrode circuit; the amplifier output is then applied to a pen recorder.

Alternatively, there may be used a commercial amplifier-recorder with a full scale deflection for a one millivolt input; a 500-ohm potentiometer is connected in the electrode circuit and provides a voltage proportional to the diffusion current, of which a proportion is applied to the input of the amplifier-recorder depending on the overall sensitivity required. The amplifier-recorder can be made to give a direct reading of the dithionite concentration by adjusting the 500-ohm potentiometer until a given known dithionite concentration corresponds to an appropriate scale deflection. In this way variations in the diameter of the bore of the capillary tube can be allowed for. If only an indication of the order of concentration of, say, the dithionite in the stream passing the electrodes is required, the electrode unit may be connected directly to a low resistance microammeter, no external power supply being required.

The invention will be further illustrated by the following examples:

EXAMPLE 1

An aqueous suspension of kaolin containing 15% by weight of solids, the kaolin having a particle size distribution such that 80% by weight consisted of particles smaller than 2 microns equivalent spherical diameter, was treated with sodium dithionite solution to bleach the kaolin, and the quantity of the dithionite remaining in the suspension after the bleaching had been completed was measured by means of the polarographic apparatus shown in FIGS. 1, 2 and 3.

The effect of varying the flow rate of the suspension through the polarographic apparatus was investigated by measuring the concentration of undecomposed dithionite for a range of different flow rates. The polarographic apparatus was first calibrated with a solution of known strength so that the reading was given directly in milligrams per liter of suspension. The results are given in Table I below:

TABLE I

| Flow rate of suspension (liters per min.): | Concentration of dithionite (mg. per liter) |
|---|---|
| 0 | 68.1 |
| 3.14 | 69.6 |
| 4.47 | 69.5 |
| 5.68 | 70.0 |
| 5.80 | 69.0 |
| 10.10 | 68.0 |

These results show that for a kaolin suspension over the above range of flowrates the measurement of the concentration of dithionite remaining in the suspension is constant to within about ±1½%.

EXAMPLE 2

A second suspension containing 15% by weight of the same kaolin was treated with excess sodium dithionite to bleach the kaolin and the concentration of dithionite remaining in the suspension after the bleaching process was measured by the polarographic apparatus shown in FIGS. 1, 2 and 3. The suspension was passed through the apparatus at a steady rate of 6.0 liters per minute and the frequency of vibration of the electrode was varied. Table II gives the measurements of the concentration of undecomposed dithionite in the suspension for a range of frequencies:

TABLE II

| Frequency of vibration (Hz.): | Concentration of dithionite (mg. per liter) |
|---|---|
| 3.7 | 59.2 |
| 3.8 | 59.3 |
| 3.85 | 59.4 |
| 3.9 | 59.7 |
| 3.95 | 59.7 |
| 4.0 | 59.9 |
| 4.15 | 60.2 |
| 4.3 | 60.2 |
| 4.5 | 60.2 |
| 4.9 | 59.9 |

These results show that over the range of frequencies given above the measurement of the concentration of dithionite in the suspension is constant to within about ±0.9%.

What is claimed is:

1. A polarographic cell comprising: a housing including inlet, an outlet disposed diametrically opposite said inlet, and a baffle located adjacent to said inlet and disposed so as to divert incoming liquid into a chamber located in the housing below the level of said inlet and of said outlet; a dropping mercury electrode including a capillary tube extending into said chamber; a separator located at the outlet of said housing to trap any mercury entrained in a flowing liquid solution or suspension passing through the housing, the separator being in the form of a cylinder having a tangential inlet connected to the outlet of said housing and a central outlet which is located in the top of the cylinder; and an electromagnetic vibrator which is adapted to apply to the capillary tube of said dropping mercury electrode a substantially regular vibration having a sawtooth waveform.

2. A polarographic cell as claimed in claim 1, wherein said inlet and said outlet of the housing debouch into a cylindrical ante-chamber in which said baffle is disposed and which is disposed above, co-axial with, and of smaller diameter than said chamber.

3. A polarographic cell as claimed in claim 1, wherein said chamber contains a reference electrode.

4. A polarographic cell as claimed in claim 1, wherein said housing comprises a support section serving as a support for parts of the polarographic cell, and wherein that part of the housing which defines said chamber is removable from the remainder of the housing and is adapted to contain the mercury which falls from said dropping mercury electrode.

5. A polarographic cell as claimed in claim 4, wherein that part of the housing which defines said chamber is made of a transparent material.

6. A polarographic cell as claimed in claim 5, wherein said transparent material is polymethylmethacrylate.

7. A polarographic cell comprising: a dropping mercury electrode including a capillary tube; a housing including an inlet, an outlet disposed diametrically opposite said inlet, a baffle located adjacent to said inlet and disposed so as to divert incoming liquid into a chamber in which is disposed the capillary tube of said dropping mercury electrode and which is located in the housing below the level of said inlet and of said outlet, and a support section serving as a support for other parts of the polarographic cell, the inlet and the outlet being disposed so as to debouch into a cylindrical ante-chamber in which said baffle is disposed and which is disposed above, co-axial with, and of smaller diameter than said chamber, and that part of the housing which defines said chamber being removable from the remainder of the housing and being adapted to contain the mercury which falls from said dropping mercury electrode; a separator located at the outlet of said housing to trap any mercury entrained in a flowing liquid solution or suspension passing through the housing, the separator being in the form of a cylinder having a tangential inlet connected to the outlet of said housing and a central outlet which is located in the top of the cylinder; and an electromagnetic vibrator which is adapted to apply to the capillary tube of said dropping mercury electrode a substantially regular vibration having a sawtooth waveform.

8. A polarographic cell as claimed in claim 7, wherein said chamber contains a reference electrode.

9. A polarographic cell as claimed in claim 7, wherein that part of the housing which defines said chamber is formed of a transparent material.

10. A polarographic cell as claimed in claim 9, wherein said transparent material is polymethylmethacrylate.

11. A polarographic cell comprising: a dropping mercury electrode including a capillary tube; a housing including an inlet, an outlet disposed diametrically opposite said inlet, a baffle located adjacent to said inlet and disposed so as to divert incoming liquid into a chamber in which is disposed the capillary tube of said dropping mercury electrode and which is located in the housing below the level of said inlet and of said outlet, and a support section serving as a support for parts of the polarographic cell, the inlet and the outlet being disposed so as to debouch into a cylindrical ante-chamber in which said baffle is disposed and which is disposed above, co-axial with and of smaller diameter than said chamber, and that part of said housing which defines said chamber being (a) removable from the remainder of the housing, (b) adapted to contain the mercury which falls from said dropping mercury electrode, and (c) formed of a transparent material; a reference electrode disposed within said chamber and spaced apart from said dropping mercury electrode; means for controlling the rate of flow of a flowing liquid solution or suspension passing through said housing; a separator located at the outlet of said housing to trap any mercury entrained in a flowing liquid solution of suspension passing through the housing, the separator being in the form of a cylinder having a tangential inlet connected to the outlet of said housing and a central outlet which is located in the top of the cylinder; and an electromagnetic vibrator which is adapted to apply to the capillary tube of said dropping mercury electrode a substantially regular vibration having a sawtooth waveform.

12. An analytical system including a polarographic cell comprising: a housing including an inlet, an outlet disposed diametrically opposite said inlet, and a baffle located adjacent to said inlet and disposed so as to divert incoming liquid into a chamber located in the housing below the level of said inlet and of said outlet; a dropping mercury electrode including a capillary tube extending into said chamber; a separator located at the outlet of said housing to trap any mercury entrained in a flowing liquid solution or suspension passing through the housing, the separator being in the form of a cylinder having a tangential inlet connected to the outlet of said housing and a central outlet which is located in the top of the cylinder; an electromagnetic vibrator which is adapted to apply to the capillary tube of said dropping mercury electrode a substantially regular vibration having a sawtooth waveform; a reference electrode; and means for recording the electrical output developed between said reference electrode and said dropping mercury electrode.

References Cited

UNITED STATES PATENTS

| | | | |
|---|---|---|---|
| 866,084 | 1/1906 | Stiglitz | 209—211 |
| 3,052,361 | 9/1962 | Whatley et al. | 209—211 |
| 3,091,579 | 5/1963 | Basilevsky | 204—99 |
| 3,471,018 | 10/1969 | Slieplevich et al. | 209—211 |
| 2,232,128 | 2/1941 | Muller | 204—99 |
| 2,849,391 | 8/1958 | Ladisch | 204—195 H |
| 3,210,261 | 10/1965 | Tyler | 204—195 H |
| 3,304,243 | 2/1967 | Capuano | 204—195 H |

OTHER REFERENCES

"Analytical Chemistry," vol. 23, No. 7, 1951, pp. 1040 and 1041.

"Bulletin of the Chem. Soc. of Japan," Sept., 1958, vol. 31, pp. 767 and 768.

"Bulletin of the Chem. Soc. of Japan," Sept. 1959, vol. 32, pp. 994–997.

"Polarograph," Kolthoff et. al., 2d ed., 1952, pp. 316 and 323.

TA-HSUNG TUNG, Primary Examiner

U.S. Cl. X.R.

204—1 T; 209—211